Sept. 19, 1967     M. G. MATRY     3,342,368
LITTER CONTAINER
Filed March 25, 1965

INVENTOR.
MICHAEL G. MATRY

BY
Lockwood, Woodard, Smith & Weikart
Attorneys

United States Patent Office 3,342,368
Patented Sept. 19, 1967

3,342,368
LITTER CONTAINER
Michael G. Matry, 919 N. Bosart Ave.,
Indianapolis, Ind. 46201
Filed Mar. 25, 1965, Ser. No. 442,744
9 Claims. (Cl. 220—1)

ABSTRACT OF THE DISCLOSURE

A litter container having an exterior casing provided with a hinged lid with an inwardly opening access panel for depositing litter, a removable litter basket within the casing, and a removable floor assembly for the casing having an upstanding cylindrical member perforated with drainage and ventilation holes and covered with an imperforate flanged plate.

---

Concepts of the invention provide a litter container having novel and advantageous features of ventilation, drainage and cleaning.

According to the inventive concepts, the container is provided with a novel bottom assembly, incorporating a floor dished to provide drainage, and carrying an upstanding perforated member providing both ventilation and drainage, protected by an overhanging flange to protect against blocking of the ventilating and drainage openings, the entire assembly being readily removable for cleaning.

Figure 1:
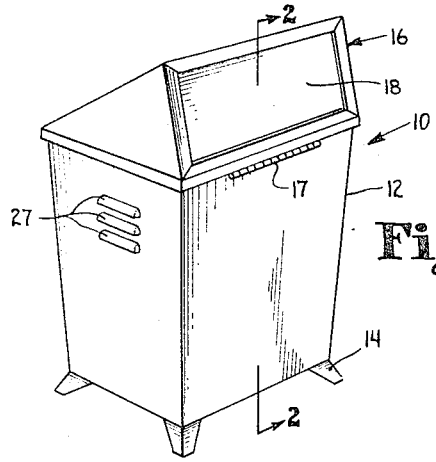
Figure 2:
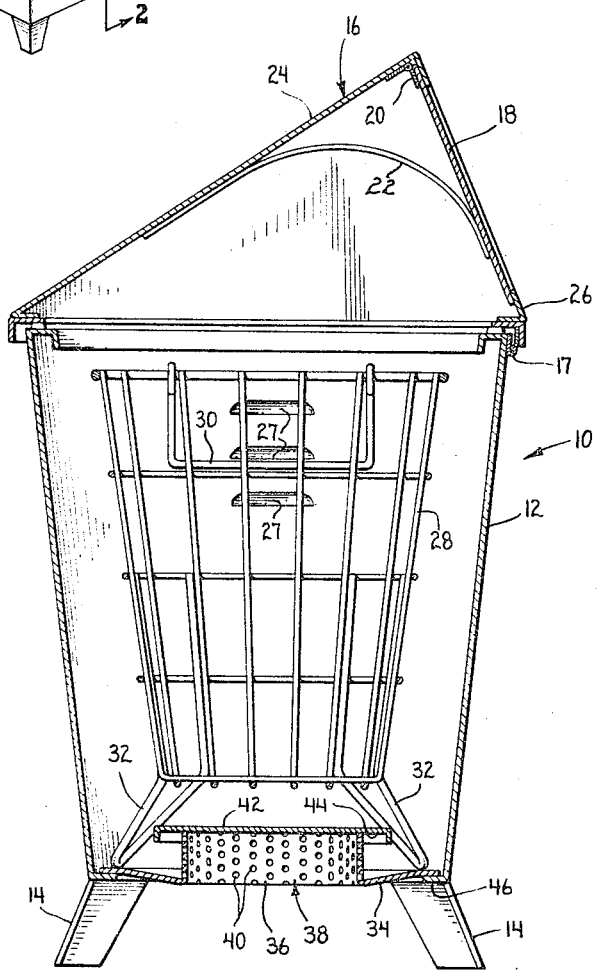

These and other objects, features, and advantages of the invention appear in the following more detailed description of an illustrative embodiment thereof, reference being had to the accompanying somewhat diagrammatic drawings, in which:

FIG. 1 is a pictorial exterior view of a trash can according to the invention; and FIG. 2 is a vertical cross-sectional view of the trash can shown in FIG. 1, illustrating interior details.

A shown in the drawings, a trash container or can 10 according to concepts of the present invention generally comprises a box-like exterior casing 12 having legs 14 at its bottom, and, at its top, an openable cover 16 hinged as by hinge 17 to the casing 12.

The cover 16 has a front access door panel 18 hinged at its top, as by hinge 20, to the cover 16, the door 18 being inwardly openable; and a strip of resilient stock 22, of a downwardly-opening U-shaped configuration, interconnects the panel 18 and a rear panel 24 of the cover 16, providing a spring bias to hold the panel 18 shut against framing of the front cover panel 26.

Upper vents 27 are shown provided by integrally-struck portions of the side panels of the casing 12.

A basket 28 is carried within the casing 12, the basket having handles 30 at its top, and feet 32. As shown the basket 28, and its handles 30 and feet 32, are all formed from heavy wire or rod stock; and its outer dimension is small enough that it may be removed through the top of the casing 12.

According to concepts of the present invention, the floor 34 of the casing 12 is formed, of heavy metal sheet stock, into a dished or upwardly concave shape, central portions thereof being lower than outer portions; and the central portion of the floor is provided with a large circular opening 36.

A cylindrical drainage and bottom-ventilating member 38 upstands a substantial height from the edge of the floor-opening 36, the member 38 being provided with a multiplicity of openings such as the perforations 40. The upper face of the member 38 is shown as covered by a circular plate 42, it being noted that the plate 42 extends outwardly of the cylindrical surface, providing an overhanging flange 44.

The basket legs 32, it will be noted, support the basket 28 at a height such that its bottom is at a spaced location above the member 38 and its cover plate 42, and the overall dimensions of the basket 28 is such that the basket is spaced from the casing 12, providing good ventilation; and the basket legs 32 have an outward extent to assure the positioning of the basket 28 in a generally central location providing the ventilating space between the basket 28 and the casing.

The floor 34, with its drainage member 38, is restingly supported by an inturned flange 46 shown integrally formed from the lower edge of the side panels of the casing 12; and thus the floor assembly is readily removable.

The concepts provide a ventilated container by which air circulation can dry off the basket contents, the upraised length of the member 38 together with its overhanging flange 44 minimizing the chance that any spillage of trash exteriorly of the basket 28 will completely block the bottom venting provided by the openings 40; and the dished configuration of the floor 34 permits any liquids to flow inwardly to exit the casing 12 via the drainage means provided by the openings 40. Moreover, the ready removability of the floor 34, with its drainage and ventilating member 38, provides convenience of cleaning any accumulation of debris on the floor 34 or against the member 38.

Accordingly, it will be seen that the present invention provides a novel litter container which has advantageous features and characteristics of air circulation and cleaning ease.

It will thus be seen from the foregoing description of the invention according to the illustrative embodiment, considered with the accompanying drawings and claims, that the invention provides a novel and advantageous litter container device having desirable characteristics and accomplishing its intended objects, including those hereinbefore pointed out and others which are inherent in the invention.

It will be understood that modifications and variations may be effected without departing from the scope of the novel concepts of the present invention; accordingly the invention is not to be considered limited to the specific form or arrangement herein described and shown.

What is claimed is:

1. A litter container having an exterior casing and a removable litter basket disposed within the casing, comprising:
    a floor assembly for the casing, including a floor member and a drainage and ventilating member upstanding a substantial extent therefrom and provided with opening means;
    the floor being upwardly concave to provide that liquids spilled thereon will run to the region of said drainage and ventilating member to exit the casing via the opening means of said member;
    the drainage and ventilating member being covered by a plate member extending outwardly therefrom and providing an overhanging flange affording protection for the openings of the said drainage and ventilating member against blocking the opening means thereof;
    the basket being smaller than the casing and provided with outwardly-extending legs to assure a positioning of the basket in a generally central location providing ventilating space between the basket and the casing;
    the floor assembly being restingly supported by the casing and removable therefrom for cleaning any accumulation of debris on the floor member or against the drainage and ventilating member.

2. A litter container having an exterior casing and a removable litter basket disposed within the casing, comprising:

a floor assembly for the casing, including a floor member and a drainage and ventilating member upstanding a substantial extent therefrom and provided with opening means;

the drainage and ventilating member being covered by a plate member extending outwardly therefrom and providing an overhanging flange affording protection for the openings of the said drainage and ventilating member against blocking the opening means thereof.

3. A litter container having an exterior casing and a removable litter basket disposed within the casing, comprising:

a floor assembly for the casing, including a floor member and a drainage and ventilating member upstanding a substantial extent therefrom and provided with opening means; the drainage and ventilating member being covered by a plate member extending outwardly therefrom and providing an overhanging flange affording protection for the openings of said drainage and ventilating member against blocking the opening means thereof;

the basket being smaller than the casing and provided with outwardly-extending legs to assure a positioning of the basket in a generally central location providing ventilating space between the basket and the casing.

4. A litter container having an exterior casing and a removable litter basket disposed within the casing, comprising:

a floor assembly for the casing, including a floor member and a drainage and ventilating member upstanding a substantial extent therefrom and provided with opening means; the drainage and ventilating member being covered by a plate member extending outwardly therefrom and providing an overhanging flange affording protection for the openings of said drainage and ventilating member against blocking the opening means thereof;

the floor assembly being restingly supported by the casing and removable therefrom for cleaning any accumulation of debris on the floor member or against the drainage and ventilating member.

5. In a litter container having an exterior casing and a removable litter basket disposed within said casing, a floor assembly for said casing comprising:

a removable upwardly concave floor member restingly supported by said casing;

said floor member being provided with a central opening;

an upstanding drainage ventilating member surrounding said central opening;

said drainage and ventilating member provided with opening means;

a plate member covering said drainage and ventilating member and extending outwardly therefrom providing an overhanging flange affording protection against blocking the opening means of said drainage and ventilating member.

6. The structure described in claim 5 wherein said central opening is circular.

7. The structure described in claim 5 wherein said opening means includes said drainage and ventilating member being perforated with a plurality of holes.

8. The structure described in claim 5 wherein said plate member is provided with an integral dependent flange extending downwardly toward said floor member to provide an annular opening to said drainage and ventilating member between said plate member and said floor member.

9. The structure described in claim 5 wherein said removable litter basket has outwardly-extending legs to assure the positioning of said basket in a generally central location and providing ventilating space between said basket and said casing.

References Cited
UNITED STATES PATENTS

| | | | |
|---|---|---|---|
| 1,478,884 | 12/1923 | Becker | 220—1 |
| 3,074,583 | 1/1963 | Martinich | 220—17 |

THERON E. CONDON, *Primary Examiner.*

G. T. HALL, *Assistant Examiner.*